United States Patent
Douglas et al.

(10) Patent No.: US 10,866,728 B2
(45) Date of Patent: Dec. 15, 2020

(54) NOTCH TASKBAR

(71) Applicant: Lenovo (Singapore) Pte. Ltd., Singapore (SG)

(72) Inventors: David W. Douglas, Cary, NC (US); Koji Kawakita, Kanagawa (JP); Moriyuki Tsuchihashi, Kanagawa (JP); Kazuo Fujii, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/168,238

(22) Filed: Oct. 23, 2018

(65) Prior Publication Data
US 2020/0125254 A1  Apr. 23, 2020

(51) Int. Cl.
*G06F 3/048* (2013.01)
*G06F 3/0488* (2013.01)
*G06F 3/0484* (2013.01)

(52) U.S. Cl.
CPC ...... *G06F 3/04886* (2013.01); *G06F 3/04847* (2013.01)

(58) Field of Classification Search
CPC ... G06F 3/04886; G06F 3/04847; G06F 3/048
See application file for complete search history.

(56) References Cited

U.S. PATENT DOCUMENTS

| | | | | |
|---|---|---|---|---|
| 2007/0094360 | A1* | 4/2007 | Forlenza | G06Q 10/107 709/220 |
| 2008/0215347 | A1* | 9/2008 | Suzuki | G06Q 40/06 705/1.1 |
| 2014/0129913 | A1* | 5/2014 | Advani | G06Q 10/101 715/226 |
| 2016/0179312 | A1* | 6/2016 | Lam | G06F 3/04842 715/738 |
| 2017/0285894 | A1* | 10/2017 | Barrus | G06F 9/485 |
| 2018/0052571 | A1 | 2/2018 | Seol et al. | |
| 2018/0189369 | A1* | 7/2018 | Baek | G06F 16/27 |
| 2019/0281154 | A1* | 9/2019 | Choi | H04M 1/72583 |

FOREIGN PATENT DOCUMENTS

CN 108021306 A 5/2018
EP 3540578 A1 9/2019

OTHER PUBLICATIONS

Swider, Matt, LG V10 Review, TechRadar, Mar. 15, 2016, 6 pages, available at https://www.techradar.com/reviews/phones/mobile-phones/lg-v10-1305854/review, last accessed Jul. 14, 2020.

* cited by examiner

*Primary Examiner* — Jeanette J Parker
(74) *Attorney, Agent, or Firm* — Ference & Associates LLC (57) ABSTRACT

One embodiment provides a method, including: receiving, at a notch taskbar integrally coupled to an information handling device, an indication to perform an action, wherein the notch task bar is positioned adjacent to a notch of the information handling device; and performing, using a processor, the action Other aspects are described and claimed.

14 Claims, 6 Drawing Sheets

NOTCH TASKBAR

BACKGROUND

There has been an increasing trend toward narrower bezels on information handling devices ("devices"), for example smart phones, tablet devices, laptop and personal computers, and the like. With this trend, LCD suppliers are designing panels with cameras integrated in a way that encroaches into an active area of the display screen. Panels with encroaching bezel portions have become known as notched display panels, wherein the notch portion of the bezel comprises a camera and/or one or more other sensors.

BRIEF SUMMARY

In summary, one aspect provides a method, comprising: receiving, at a notch task bar integrally coupled to an information handling device, an indication to perform an action, wherein the notch task bar is positioned adjacent to a notch of the information handling device; and performing, using a processor, the action.

Another aspect provides an information handling device, comprising: a notch task bar integrally coupled to the information handling device, wherein the notch task bar is positioned adjacent to a notch of the information handling device; a processor; a memory device that stores instructions executable by the processor to: receive, at the notch task bar, an indication to perform an action; and perform, using the notch task bar, the action.

A further aspect provides a product, comprising: a storage device that stores code, the code being executable by a processor and comprising: code that receives an indication to perform an action by a notch taskbar; and code that performs the action at the notch taskbar.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology advances, bezels of display screens continue to become thinner. A natural result of this trend is that the area of a display portion increases, which allows a user to visualize more content on a single screen. However, the small size of the bezel has made it challenging to include important and helpful sensors conventionally embedded in the bezel (e.g., cameras, light sensors, other sensors, etc.). A resolution to this issue has been to extend a small portion of the bezel (e.g., a middle portion of the top bezel, etc.) into the active area of the display screen. This expanded bezel portion has become known as a "notch" and generally contains one or more of the aforementioned sensors.

Because the notch extends into an active area of a display, the areas immediately adjacent to the notch conventionally have not been used for anything other than displaying existing content on the screen. Therefore, an aim of the underlying embodiments in this application is to utilize the adjacent areas next to the notch as a taskbar to display notifications, allow users to provide command inputs via interaction with one or more setting adjustment portions, and the like. Furthermore, such a taskbar may be independent from the underlying device operating system ("OS"), allowing for custom configuration of the taskbar outside the design and software requirements of the OS manufacturer.

Accordingly, an embodiment provides a notch taskbar positioned in the empty spaces around a notch. In an embodiment, a device may comprise a notch task bar that may be integrally coupled to the device. The notch task bar may be positioned adjacent to a notch of the device. More particularly, the notch task bar may be positioned in the left and right spaces around a notch that have conventionally been utilized as display areas. In an embodiment, the notch taskbar may comprise a plurality of different portions. For example, a portion of the notch taskbar may be dedicated to displaying alert notifications (e.g., social media notifications, calendar notifications, other notifications, etc.). As another example, other portions of the notch taskbar may be dedicated to setting adjustment buttons that a user may interact with (e.g., volume adjustment buttons, screen brightness adjustment buttons, other adjustment buttons, etc.). Accordingly, an embodiment may receive an indication (e.g., a signal sent from the system or another source to the notch taskbar, user input provided directly to the notch taskbar, etc.) at the notch taskbar to perform a task (e.g., adjust a setting, display a notification, perform another action, etc.) that an embodiment may thereafter perform. A notch taskbar according to the embodiments may therefore make use of the conventional empty space around the notch and provide special functionality to a user.

The illustrated example embodiments will be best understood by reference to the figures. The following description is intended only by way of example, and simply illustrates certain example embodiments.

Figure 1:
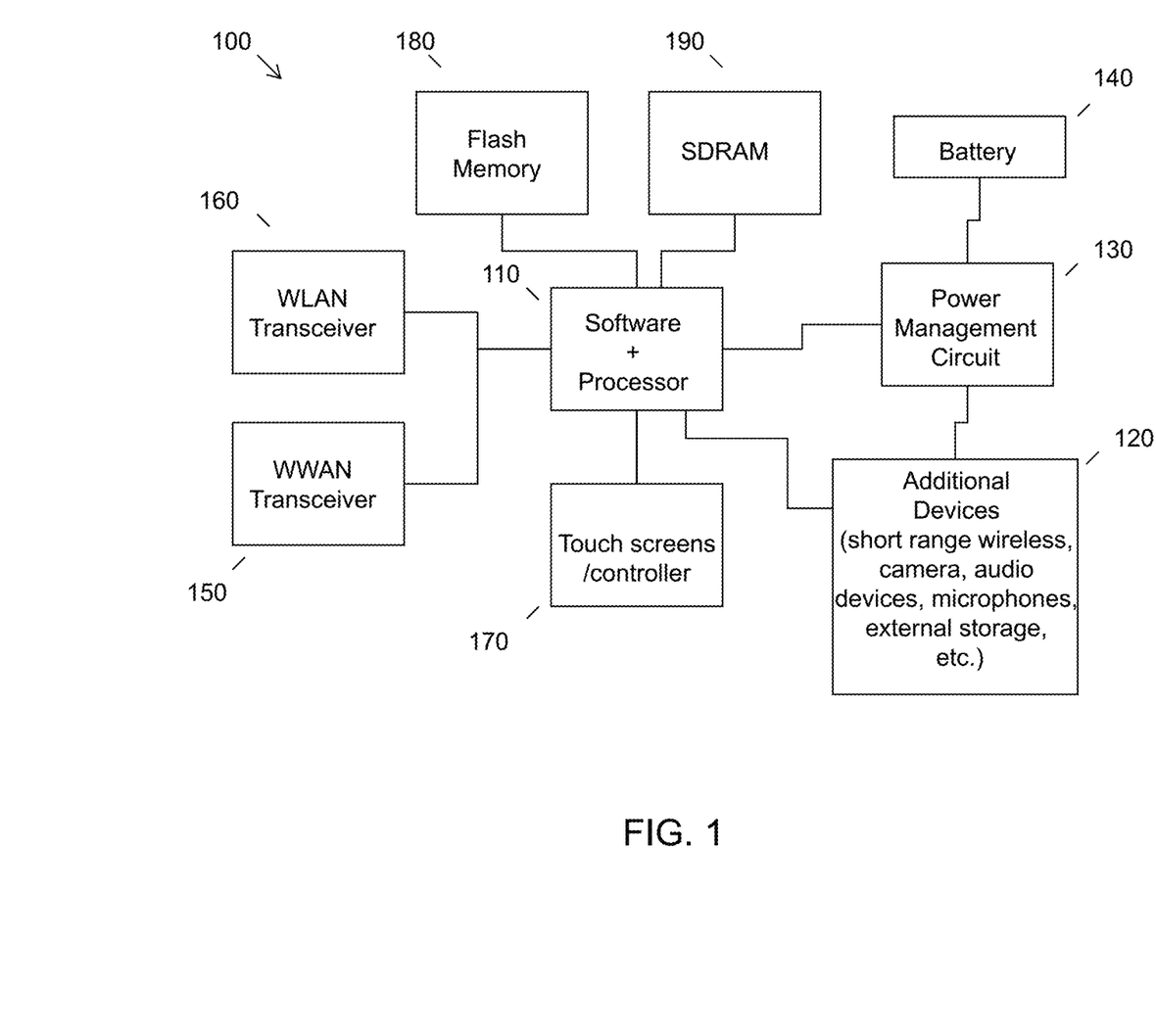
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
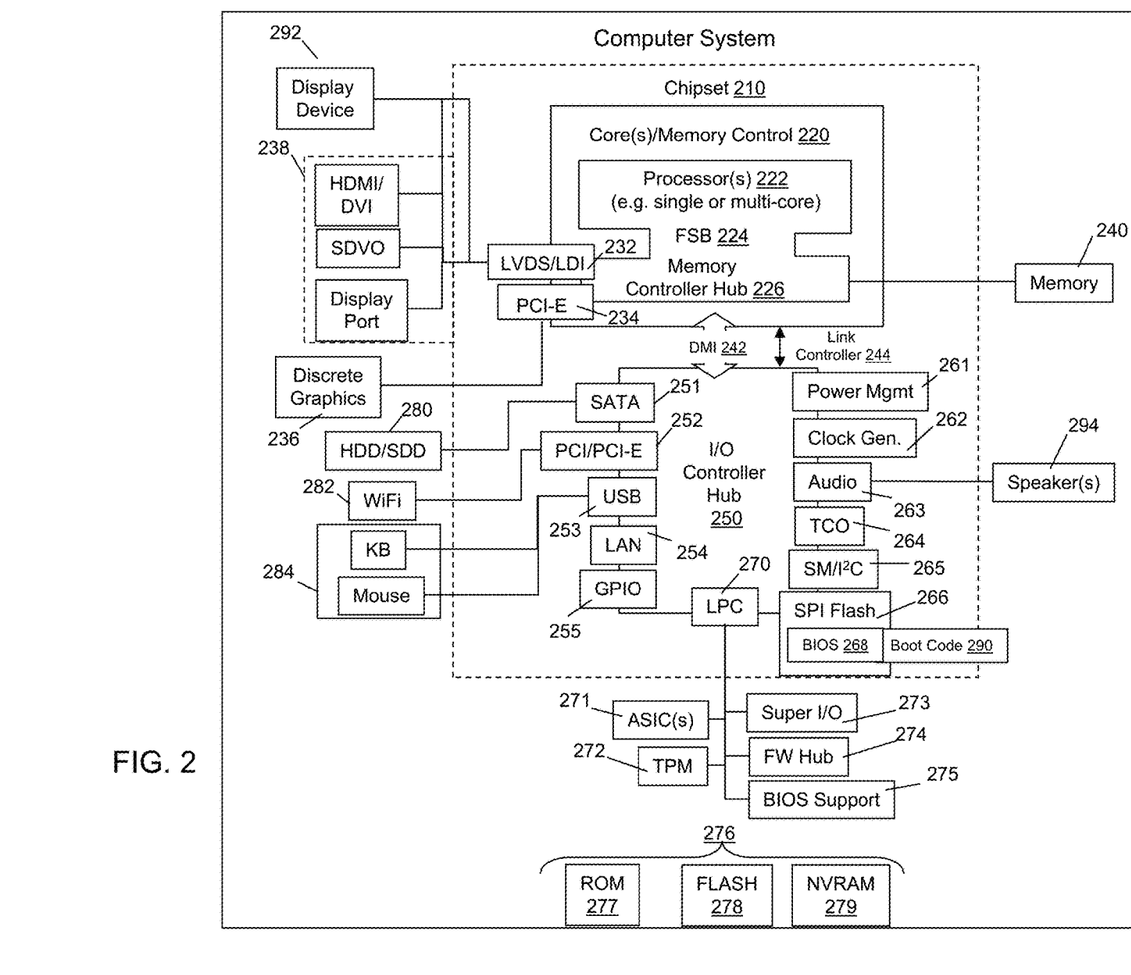
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, personal and laptop computer devices generally, and/or electronic devices that comprise a notch in the bezel of their display screen. For example, the circuitry outlined in FIG. 1 may be implemented in a tablet or smart phone embodiment, whereas the circuitry outlined in FIG. 2 may be implemented in a laptop embodiment.

Figure 3:
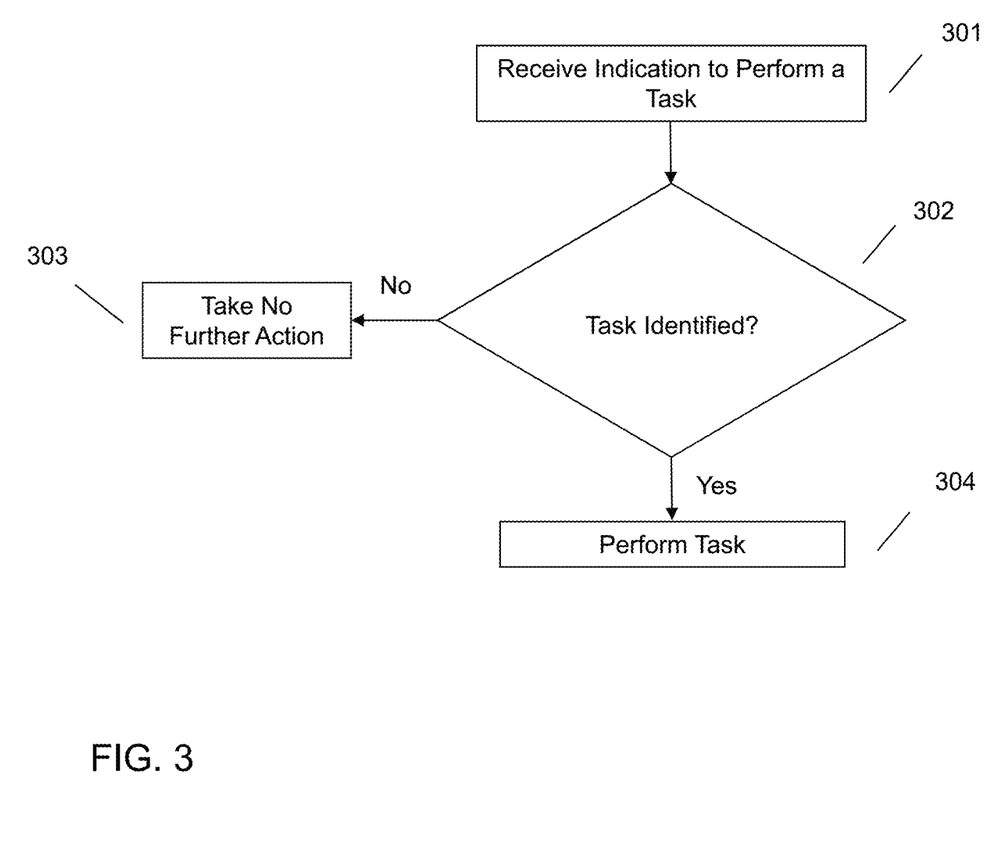
FIG. 3 illustrates an example method of utilizing a notch task bar to perform tasks and display notifications.
Figure 4:
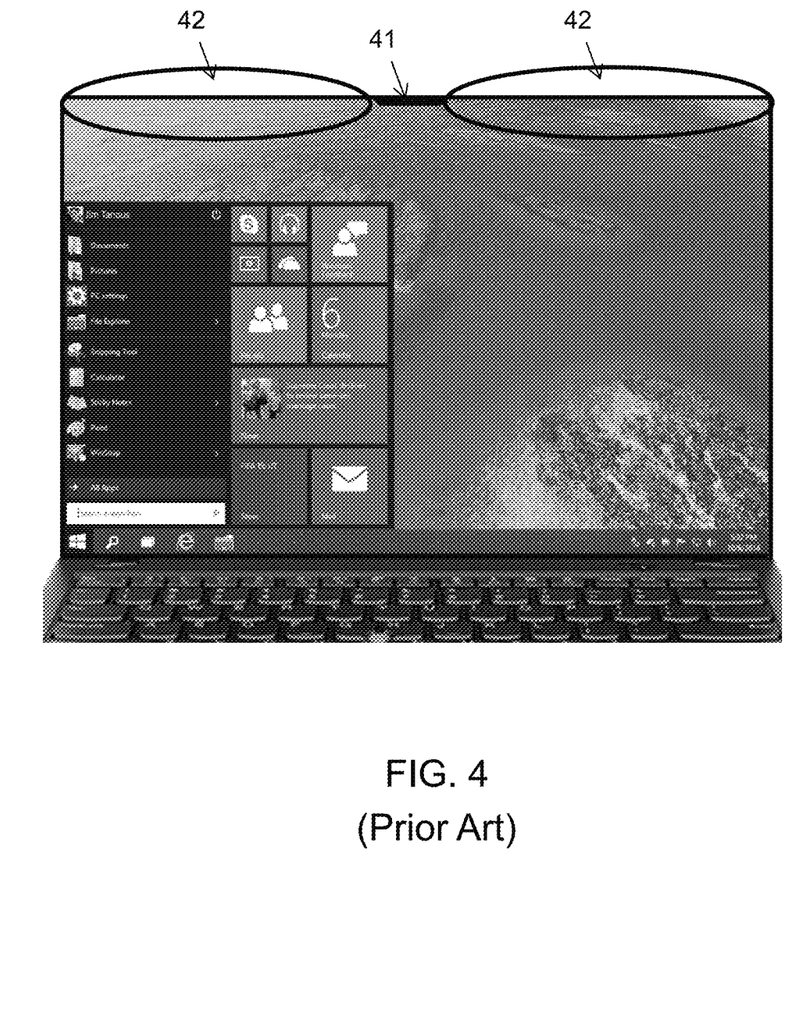
FIG. 4 illustrates a conventional laptop computer having a notch.

Referring now to FIG. 3, an embodiment presents a method of receiving an indication to perform an action at a notch taskbar integrated into adjacent areas around a notch. At 301, an embodiment may receive an indication to perform a task at a notch taskbar integrally coupled to a display of the device. In the context of this application, a notch taskbar may be a taskbar that occupies a space to the left of the notch, to the right of the notch, or both. The space adjacent to the notch may be a space that was conventionally used as an active display area. For example and with reference to FIG. 4, a notch is illustrated at 41. The notch 41 may be an extension of the bezel of the display and may comprise one or more sensors commonly found on the front-facing bezels of conventional devices (e.g., a camera, a light sensor, another sensor, etc.). In an embodiment, the notch taskbar may occupy one or both of the spaces 42 to the left and right of the notch 41.

Figure 5:
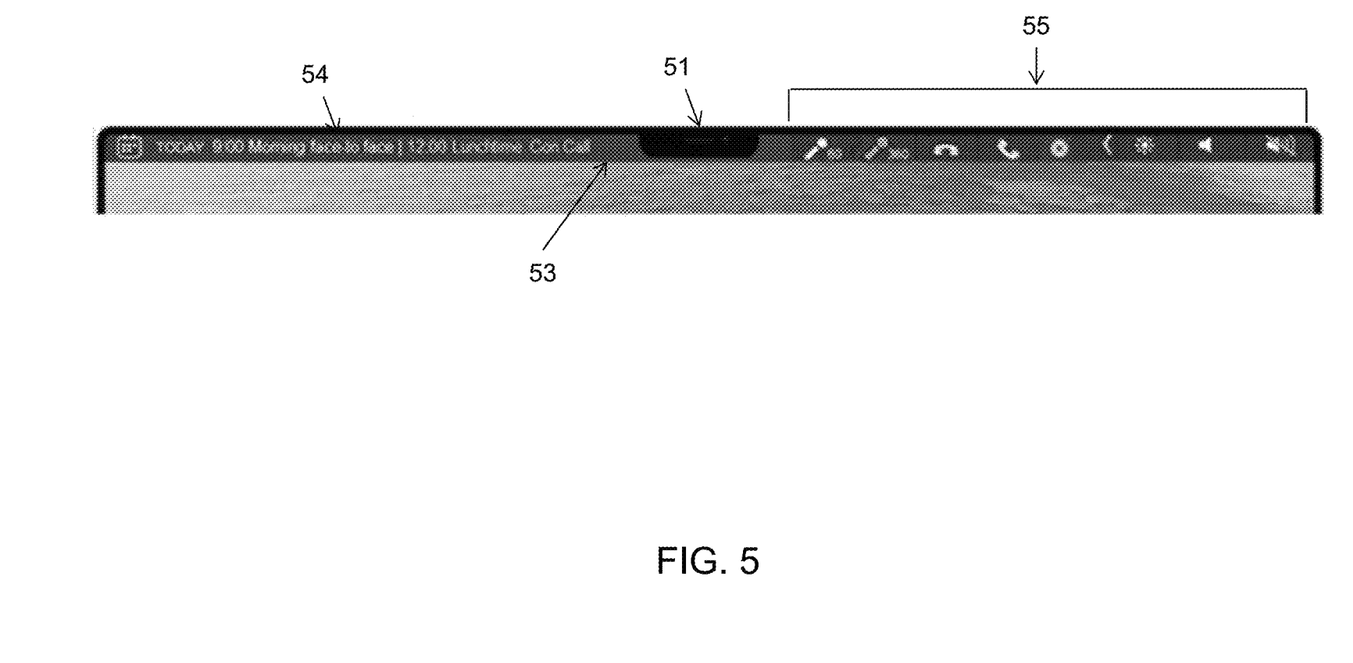
FIG. 5 illustrates a notch taskbar according to an embodiment.

Referring now to FIG. 5, an example illustration of a notch taskbar is presented. In the configuration illustrated in FIG. 5, the notch taskbar 53 occupies both spaces adjacent to the notch 51. However, it is important to note that this configuration is not limiting, and, as previously mentioned, the notch taskbar 53 may only occupy one of the spaces. Additionally, the notch taskbar may not extend all the way to a side edge of the display, as illustrated in FIG. 5. Rather, in some embodiments (not pictured), the notch taskbar may only extend part of the way to the side edge of the display, leaving additional space between the end of the notch taskbar and a side of the display. In an embodiment, a bottom edge of the notch taskbar may be substantially flush with a bottom edge of the notch.

In an embodiment, the notch taskbar may operate independently from, but communicate with, the underlying OS of the device. Stated differently, the notch taskbar may be a hardware piece that is particular to the device itself but that is compatible with an OS run by the device. For example, a user may provide touch inputs to a portion of the notch taskbar and those inputs may communicate with an active application being run by the OS.

In an embodiment, the notch taskbar may be comprised of a plurality of different portions. Each of the portions may provide a user with a particular piece of information or may allow a user to perform a certain task. For example, referring again to FIG. 5, a portion 54 of the notch taskbar may be dedicated to providing notifications to a user. In the context of this application, a notification may be one or more of a social media notification (e.g., a friend request, a post notification, etc.), a communication notification (e.g., a received email, a received text message, etc.), a calendar notification (e.g., for an upcoming meeting or event, etc.), and the like.

Figure 6:
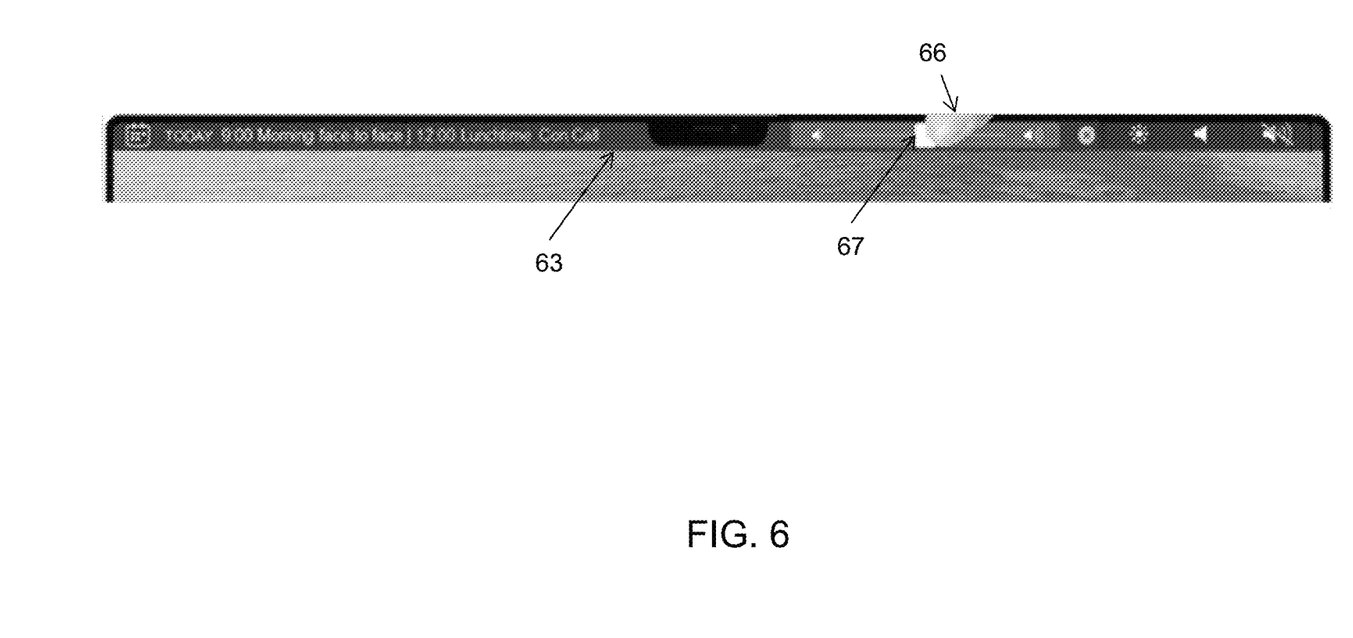
FIG. 6 illustrates a notch taskbar according to an embodiment.

In other embodiments, still with reference to FIG. 5, other portions 55 of the notch taskbar may be configured to receive user inputs and perform corresponding tasks. For example, in an embodiment, the entirety of the notch taskbar, or certain portions thereof, may be capable of directly receiving user inputs. For instance, some or all portions of the notch taskbar may be a touch-sensitive strip that is capable of receiving and processing user touch inputs. In an embodiment, these interactive portions may comprise setting adjustment buttons that a user may interact with (e.g., volume adjustment buttons, screen brightness adjustment buttons, other adjustments buttons, etc.). For example, referring now to FIG. 6, a notch taskbar 63 is illustrated in which a user 66 is adjusting the volume of audio output by the device via touch interaction with a volume slider 67. In an embodiment where the notch taskbar occupies both the left and right spaces adjacent to the notch, one side of the notch taskbar may be dedicated to providing notifications whereas the other side of the notch taskbar may be dedicated to receiving user inputs.

In certain embodiments, user interaction with a touch sensitive portion of the notch taskbar may affect content displayed on the display screen. For example, interaction with a brightness adjustment portion may affect the brightness of the display screen. As another example, the notch taskbar may comprise document editing portions (e.g., bold, underline, italicize, etc.) that, when interacted with, may adjust an aspect of a portion of a displayed document. In yet another example, in a situation where a notification portion of the notch taskbar is interactive, responsive to receiving touch input on the notification, an embodiment may display information associated with the notification on the device's primary display screen. For example, if the notification is a social media post notification, responsive to receiving user selection input on the notification portion of the notch taskbar, an embodiment may open the relevant social media application and display the social media post.

In an embodiment, the notch taskbar may be always on or, alternatively, may only activate when a display screen of the device is active. In a situation when the notch taskbar is active when a display screen of a device is not active, a user may still provide inputs to the notch taskbar. For example, if a song is being playing by the device, a user may interact with volume control portions on the notch taskbar to adjust the volume of the song, skip to another song, etc. In an embodiment, the notch taskbar may be a touch-sensitive reflective display. In such an instance, the notch taskbar may be configured to display portions of the notch taskbar even when the device is in an off-state.

An embodiment may receive the indication to perform the task (e.g., adjust a setting, display a notification, perform another action, etc.) from one of a variety of difference sources. For example, the indication may be derived from user-provided input (e.g., user touch input on the notch taskbar, etc.) or may be received from another source (e.g., an application running on the device that communicates with the notch taskbar to provide a notification, etc.). Responsive to receiving, at 301, an indication to perform a task, an embodiment may identify, at 302, the corresponding task and perform, at 304, the task. Responsive to not being able to identify, at 302, the task, an embodiment may take no further action.

The various embodiments described herein thus represent a technical improvement to conventional taskbars. Using the techniques described herein, an embodiment may perform one or more tasks using a notch taskbar. The notch taskbar may reside in and take advantage of the spaces adjacent to a notch of the device and may operate independently from an underlying OS. This flexibility may allow a manufacturer to customize the notch taskbar with interactive portions that they believe will provide the most value to a customer. Additionally, due to the independent nature of the notch taskbar, the portions on the notch taskbar may be selected and designed without worry about any design requirements of the underlying OS.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at a notch task bar integrally coupled to an information handling device, an indication to perform an action, wherein the notch taskbar is positioned adjacent to a notch of the information handling device and wherein the indication is associated with a touch-based command input provided to a portion of the notch taskbar; and
performing, using a processor, the action, wherein the action affects an operation in an active application of the information handling device;
wherein the notch taskbar operates independently from, but is in communication with, an operating system of the information handling device and is configured to interact with a plurality of disparate applications.

2. The method of claim 1, wherein the notch task bar comprises at least two portions, one portion of the at least two portions being associated with a notification display area and another portion of the at least two portions being associated with a setting adjustment area.

3. The method of claim 1, wherein the notch task bar horizontally extends from a left side and a right side of the notch to a left edge and a right edge of a display screen of the information handling device.

4. The method of claim 1, further comprising adjusting a visual aspect of the notch task bar responsive to receiving the indication.

5. The method of claim 1, wherein the receiving comprises receiving the touch-based command input responsive to identifying that the information handling device is in an off state.

6. The method of claim 1, wherein the indication is associated with a notification.

7. The method of claim 6, wherein the action comprises displaying the notification on the portion of the notch task bar.

8. An information handling device, comprising:
a notch task bar integrally coupled to the information handling device, wherein the notch task bar is positioned adjacent to a notch of the information handling device;
a processor;
a memory device that stores instructions executable by the processor to:
receive, at the notch task bar, an indication to perform an action, wherein the indication is associated with a touch-based command input provided to a portion of the notch taskbar; and
perform, using the notch task bar, the action, wherein the action affects an operation in an active application of the information handling device;
wherein the notch taskbar operates independently from, but is in communication with, an operating system of the information handling device and is configured to interact with a plurality of disparate applications.

9. The information handling device of claim 8, wherein the notch task bar comprises at least two portions, one portion of the at least two portions being associated with a notification display area and another portion of the at least two portions being associated with a setting adjustment area.

10. The information handling device of claim 8, wherein the notch task bar horizontally extends from a left side and a right side of the notch to a left edge and a right edge of a display screen of the information handling device.

11. The information handling device of claim 8, wherein the instructions are further executable by the processor to adjust a visual aspect of the notch task bar responsive to receiving the indication.

12. The information handling device of claim 8, wherein the indication is associated with a notification.

13. The information handling device of claim 12, wherein the action comprises displaying the notification on the portion of the notch task bar.

14. A product, comprising:
a storage device that stores code, the code being executable by a processor and comprising:
code that receives an indication to perform an action by a notch taskbar integrated into an information handling device, wherein the indication is associated with a touch-based command input provided to a portion of the notch taskbar; and
code that performs the action at the notch taskbar, wherein the action affects an operation in an active application;
wherein the notch taskbar operates independently from, but in communication with, an operating system of the information handling device and is configured to interact with a plurality of disparate applications.

* * * * *